(No Model.) 2 Sheets—Sheet 1.

R. W. CLARK.
STEAM TRAP.

No. 423,220. Patented Mar. 11, 1890.

Witnesses:
Jno. G. Stark
Al. Stark

Inventor:
Robert W. Clark,
by Michael J. & Wm. O. Stark,
Attorneys.

(No Model.) 2 Sheets—Sheet 2.

R. W. CLARK.
STEAM TRAP.

No. 423,220. Patented Mar. 11, 1890.

Witnesses:
Geo. P. Stark
Al. Stark.

Inventor:
Robert W. Clark,
by Michael J. & Wm. O. Stark,
Attorney.

UNITED STATES PATENT OFFICE.

ROBERT W. CLARK, OF BUFFALO, NEW YORK.

STEAM-TRAP.

SPECIFICATION forming part of Letters Patent No. 423,220, dated March 11, 1890.

Application filed November 9, 1889. Serial No. 329,749. (No model.)

*To all whom it may concern:*

Be it known that I, ROBERT W. CLARK, of Buffalo, in the county of Erie and State of New York, have invented certain new and useful Improvements in Steam-Traps; and I do hereby declare that the following description of my said invention, taken in connection with the accompanying sheets of drawings, forms a full, clear, and exact specification, which will enable others skilled in the art to which it appertains to make and use the same.

This invention has general reference to improvements in steam-traps; and it consists, essentially, in the novel and peculiar combination of parts and details of construction, as hereinafter first fully set forth and described, and then pointed out in the claims.

Figure 1:
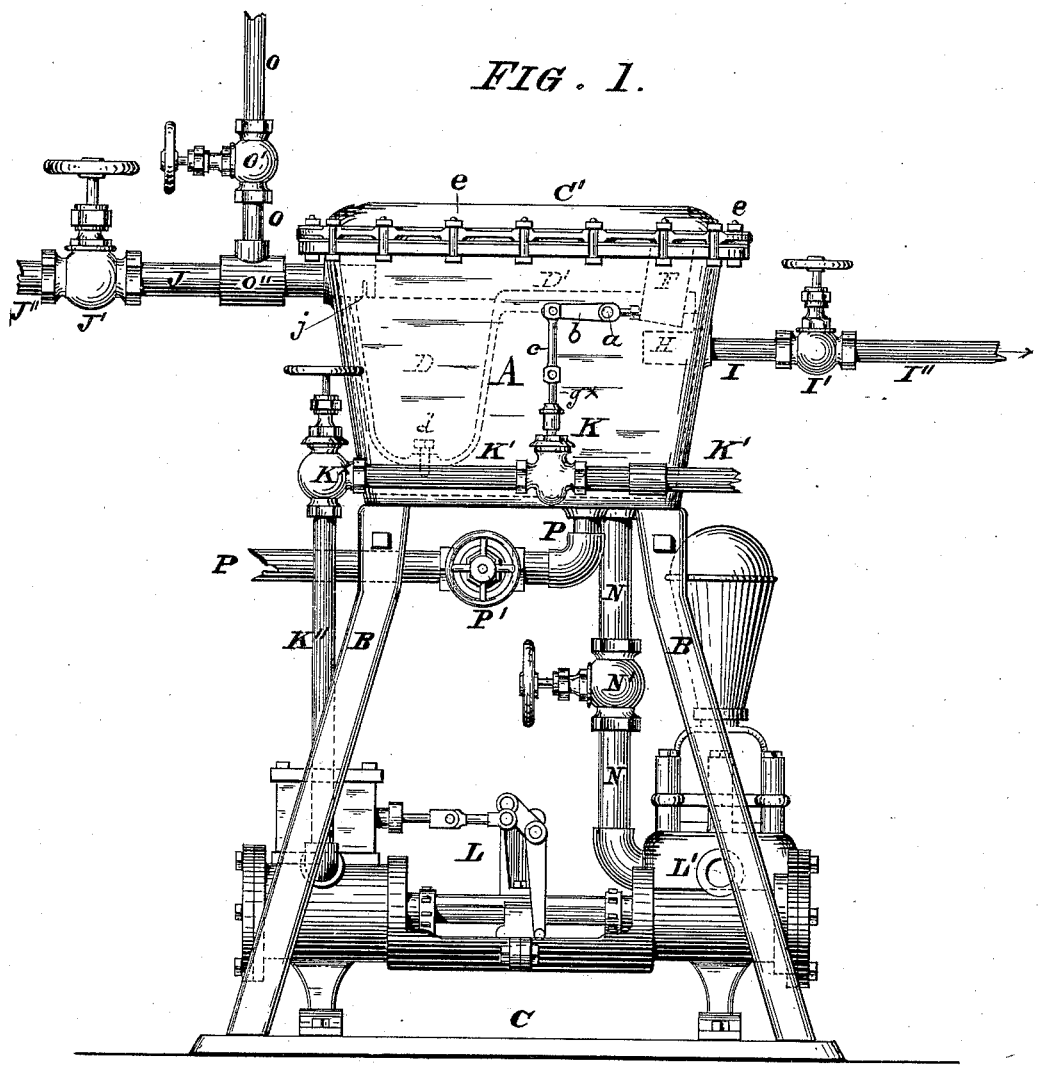
Figure 2:
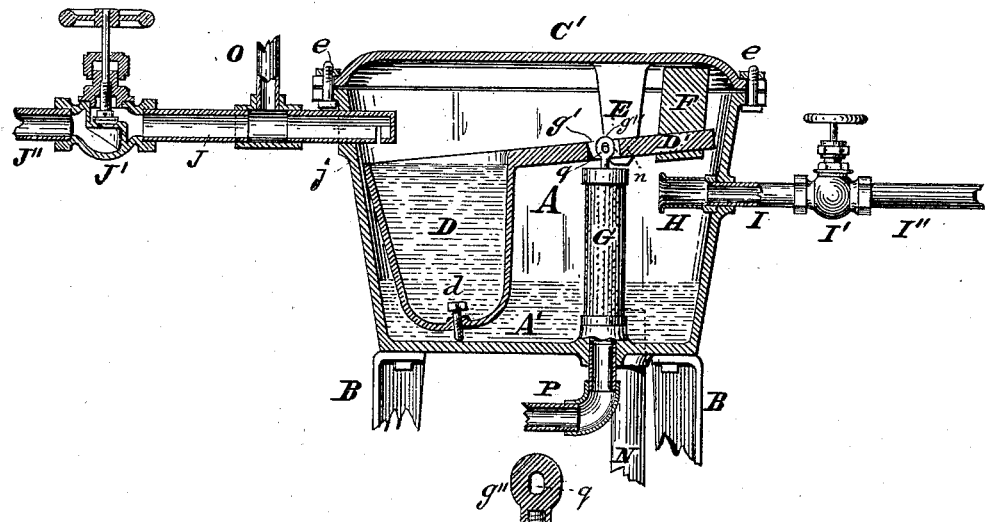
Figure 3:
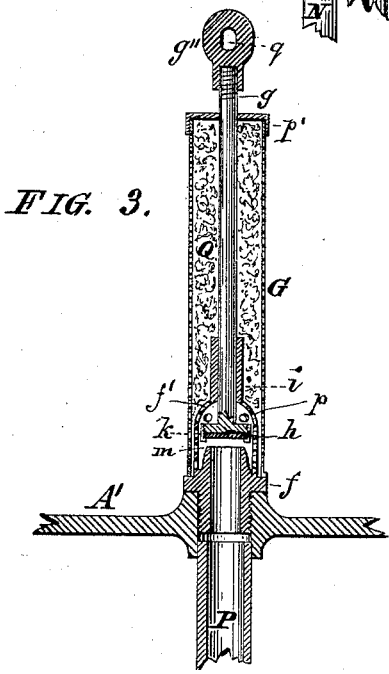

In the drawings already mentioned, which serve to illustrate my said invention more fully, Figure 1 is an elevation of my improved steam-trap. Fig. 2 is a longitudinal sectional elevation of the upper portion of the same. Fig. 3 is a longitudinal sectional elevation of the filter-valve detached.

Like parts are designated by corresponding letters of reference in all the figures.

The object of this invention is the production of an automatically-operating steam-trap for engines, steam-heating systems, and similar plants requiring the removal and utilization of the water of condensation. To attain this result, I construct my steam-trap substantially as follows:

A is a substantially rectangular receptacle having a bottom A' and a cover C', removably affixed by screw-bolts $e$, as clearly shown in the drawings, said receptacle A being preferably supported upon legs B, securely fastened upon a base or bed plate C in any well-known manner. Within this receptacle is located a pot D, having a shank or bar D', provided with suitable journals or bearings $n$, Fig. 2, and having a counter-weight F, so arranged that said pot D when filled with water is nearly in balance, the preponderance of weight being with the said pot D. The pivot for the bar D' is outwardly carried at $a$, Fig. 1, so as to receive a lever $b$, which connects with the valve-rod $g^\times$ of a valve K by a connecting-rod $c$.

In the bottom of the pot D there is located an adjusting-screw $d$, whereby the downward movement of the pot may be limited to suit the construction of the parts of the trap in an obvious manner.

In the bar D' of the pot D there is a slotted aperture $g'$ near the fulcrum $n$ of said bar, wherein is pivoted the rod $g$ of a filter-valve G by the eye $g''$, said filter-valve consisting, essentially, of a perforated shell having a cap $p'$, said shell being suitably fastened to a screw-fixture $f$, having a dome $f'$, perforated at $p$ with a suitable number of holes, there being a valve-seat $h$, (Jenkins's packing being preferred,) held to the lower face of the valve-rod by a screw-cap $k$, all as clearly shown in Fig. 3. The screw-fitting $f$ is fixed within an upwardly-projecting boss on the bottom A', while to a downwardly-pointing boss there is affixed a pipe P, having a stop-valve P', as shown in Fig. 1. From the bottom A' leads a pipe N, having a stop-valve N', said pipe being connected with the suction end of a preferably duplex steam-pump L, placed upon the base C between the legs B.

The valve K, already mentioned, connects with the steam-chest of the steam-pump by the pipe K' K'', there being a stop-valve K placed into said pipes between the stop-valve K and the said steam-chest, so that connection between the pipes K' and K'' may be intercepted without operating the stop-valve K.

Near the upper edge of the receptacle A there is a boss, from which a pipe J J'', having stop-cock J', leads to the steam-coil, radiator, or other part from which water of condensation is to be removed, there being in the pipe J a T O'', receiving in its branch a pipe O, having a stop-valve O', said pipe O, as well as the pipe K', being suitably connected with any steam-generator in a manner readily comprehended. From the side opposite to that where the pipe J enters the receptacle A there leads a discharge-pipe I I'', having a stop-valve I', said pipe I having in turn a fan-shaped spout H within the receptacle, for the object hereinafter to be described. The pipe J has a downwardly-arranged notch $j$, serving as a discharge for the pipe J, so that the pot D may always be full of the water of condensation.

The operation of this trap is substantially as follows: Assuming the pipe J'' to be properly connected with that portion of the steam-heating system requiring draining, the exhaust of an engine, &c., the pipes O and K' with a steam-generator, and the pipes P I'' with a sewer or other drain for carrying off the water of condensation that it is not desired to again use, and all the stop-valves closed, with the exception of the valve J', which allows the water to enter the receiver A through the notch $j$ in the pipe J. The pot D, being empty, is overbalanced by the weight F, and, rising, bears against the under side of the pipe J, as shown in dotted lines in Fig. 1. The water escaping from said notch $j$ fills the pot and thereby causes it to drop, which will have the effect of closing the valve K, that regulates the admission of steam to the steam-cylinder of the pump. Now the valve K is opened. Water will continue to flow into the pot and, overflowing, will begin to fill the receiver A until it has reached a height sufficient to float the same, when it will rise and open the stop-valve K to allow steam to pass to the steam-pump and to set the same agoing. The suction-pipe N of this pump connects with the interior of the reservoir A, (it projects a few inches into the same, so as not to draw it entirely empty,) and the pump will therefore draw from said reservoir so much water as is necessary to again close the stop-valve K, the action of the parts being an entirely automatic one and occurring at intervals of a greater or less duration, depending upon the amount of water to be removed.

The discharge of the pump L' is to be suitably connected with the steam-generator, so that the water may be immediately returned to the same by said pump. If for any reason the water cannot be so disposed of—as, for instance, when the pump fails to operate, or when no pump whatever is used—the valve K$^\times$ is closed and valve P' opened. Within the arm D' of the pot D is pivoted the valve-rod $g$ of the filter G, the valve $h$ of which is so adjusted as to open just when the pot has risen to a height corresponding to a level of the water a trifle above the valve-seat $m$. Now the water of condensation will pass through the perforations of the shell and through the filtering material Q therein, through the openings $p$ in the dome $f'$, and thence through the pipe P to the sewer or other place to which it is desired to convey the water. It will now be observed that the action of both the valve K and the valve $m$ in the filter are automatic, and that both continue in operation as long as the pot rises and falls in the reservoir, though either one or the other becomes operative only when its respective stop-valve K$^\times$ or P' or N' is opened, so as to afford a discharge for the water or to open the steam-passage to start the pump.

In the reservoir there is liable to accumulate lubricating-oil or other impurities carried there with the water of condensation. To rid the trap from these impurities, I provide the pipe I I'' with its stop-valve and locate in the interior of the receiver the fan-shaped spout and connect its discharge-pipe with the sewer or with an oil-extractor or other device for recovering the lubricant, and then open the steam-valve O', (first shut valve J',) when a current of steam will pass through receiver and remove the impurities from the surface of the water through the pipe I''. Closing the valves I' and O' and again opening valve J' restores the apparatus to activity.

It will be further observed that this trap, by means of its pump, is capable of forcing the water of condensation against any pressure within its scope, thus affording ready means for utilizing said water and using it over and over again, which in steam-heating systems is quite an essential feature. The facility with which changes from discharging into a sewer or using the water of condensation over again may be made by simply turning the stop-valves, as described, will be readily perceived and appreciated.

I have heretofore mentioned that if for any reason the steam-pump should fail to operate the discharge of the water of condensation would be through the pipe P; but, since this might take effect unnoticed and might cause damages of some kind or another, I guard against this by making the opening $q$ in the eye $g''$ an oblong one, so that the pivoted pot D may rise a sufficient distance to allow the valve K to give a full head of steam to the steam-pump, without, however, opening the valve $h$ in the filter. If now the pot D rises beyond this point, said valve $h$ will open, and thereby provide for a discharge through the filter and the pipe P. For this reason it will be necessary to leave the valve P' always open. It will now be seen that though either system of discharge may operate independently of the other there is a joint action between them that renders the draining of the water of condensation an absolute certainty, and that the system in which the filter-valve is used forms an auxiliary to that in which the steam-pump is the principal factor, and that, furthermore, both systems are operated by the one float-pot and accessories.

It is a well-recognized fact that in steam-traps where the water of condensation is discharged through valves actuated by a float the apparatus frequently fails to operate, owing to sediments and other impurities in the water or by greasy and gummy substances interfering with the proper operation of said valves, and requires taking apart and cleaning at frequent intervals to keep them in an operative condition. To guard against this obstacle and drawback, I surround the discharge-valve of the pipe P with a strainer, which prevents the escape of said impurities except by the pipe N, where the steam-pump will not be affected by said impurities or by the surface blow-off H and its connecting-pipes I I'. This is an essential feature in my device and accomplishes the desired result in an efficient and reliable manner.

Having thus fully described my invention, I claim as new and desire to secure to me by Letters Patent of the United States—

1. In steam-traps, the combination, with a receiver, of a pivoted float-pot, and a filter having a valve operated by said float-pot, as and for the purpose stated.

2. In steam-traps, a filter-valve consisting, in combination with the pivoted float-pot, of the perforated shell, the screw-fitting having perforated dome and valve-seat, and the valve-rod having disk-valve, said rod being pivoted to the arm of the float-pot, as and for the object set forth.

3. In steam-traps, the combination, with a closed receptacle, of a pivoted float-pot, a steam-admission valve regulated by said float-pot, a steam-pump connected with said steam-admission valve and with its suction-pipe with said closed vessel, and a filter-valve also connected with said pivoted float-pot and having a discharge-pipe, as described.

4. In a steam-trap, the combination, with the closed vessel A, having the bearings E, of the open float-pot D, provided with the shank D', having the counter-weight F, the strainer-valve G, having the valve-rod provided with the slotted aperture engaging the said shank by a bolt, the inlet-pipe J, and the discharge-pipe P, as set forth.

5. In steam-traps, the combination, with the closed vessel A, having inlet-pipe J, of a pivoted float-pot, a strainer-valve actuated by said float-pot, and a surface blow-off, as described, whereby the impurities of the water of condensation are separated from said water and separately discharged from said trap, as set forth.

6. In a steam-trap, the combination, with the closed vessel A, having the inlet-pipe J, of a pivoted float-pot consisting of an open vessel having in its shank a slotted aperture, as described, and the strainer-valve consisting of a seat $f$, a perforated dome $f'$, a valve-rod $g$, having the valve $i$, and the perforated jacket, said valve-rod being connected with the shank D' by a bolt passing through said slotted aperture, as and for the object stated.

In testimony that I claim the foregoing as my invention I have hereto set my hand in the presence of two subscribing witnesses.

ROBT. W. CLARK.

Attest:
MICHAEL J. STARK,
WM. O. STARK.